Figure 1:
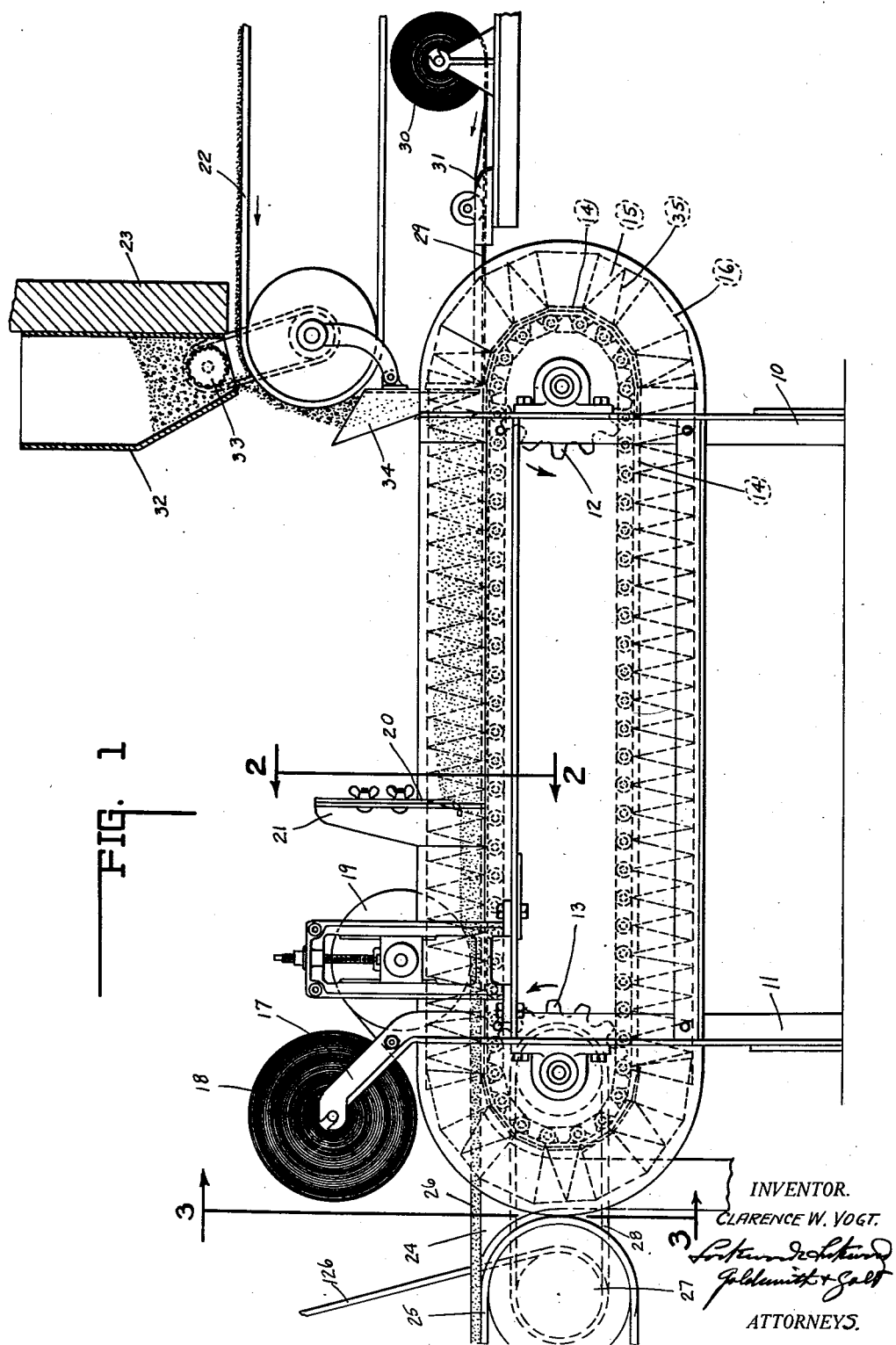

June 16, 1931.  C. W. VOGT  1,810,862
DENSITY CONTROL AND DELIVERY OF ICE CREAM OR THE LIKE
Filed Oct. 27, 1927  2 Sheets-Sheet 1

INVENTOR.
CLARENCE W. VOGT.
ATTORNEYS.

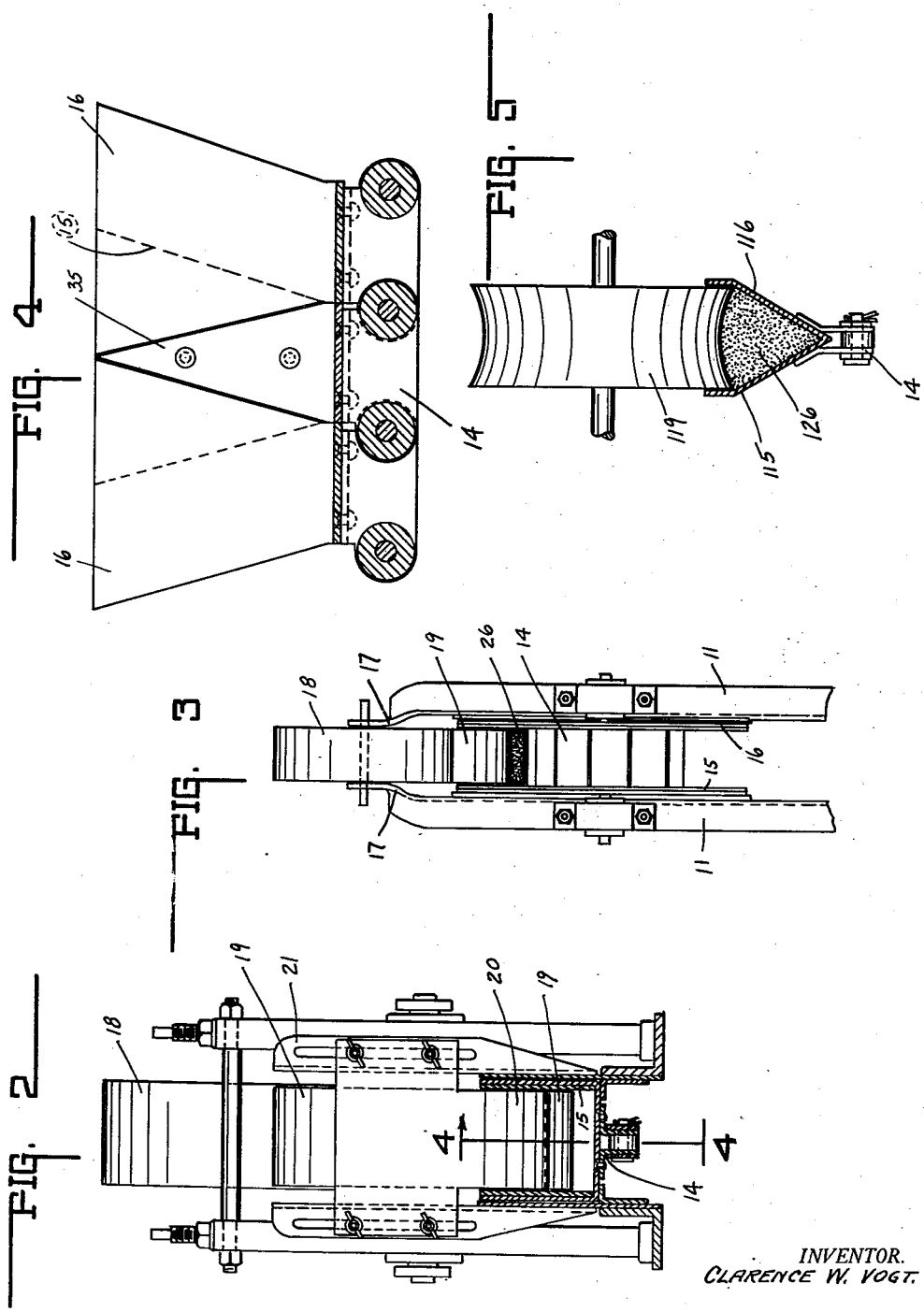

Patented June 16, 1931

1,810,862

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION OF DELAWARE

DENSITY CONTROL AND DELIVERY OF ICE CREAM OR THE LIKE

Application filed October 27, 1927. Serial No. 229,180.

This invention relates to a density control and delivery of ice cream or the like.

The principal object of the invention is to provide a continuously operating mechanism for delivering ice cream from freezing machines of the character more fully set forth in my prior Patents No. 1,733,740, issued October 29, 1929, and No. 1,742,171 issued December 31, 1929, and also to form the ice cream into continuous strip of the desired form and density from which bricks of ice cream may be cut.

In the said prior patents, I disclose a method and apparatus of freezing ice cream in a flake-like form with air incorporated therein.

Another feature of the invention resides in the arrangement for providing the usual paraffin paper upon the strip for protection purposes, as will be hereinafter more specifically set forth and described.

Still another feature of the invention resides in the form and construction of the endless conveyor with side plates mounted thereon to permit the conveyor to freely turn while presenting smooth surfaced walls between which the ice cream is compressed.

The full nature of the invention will be understood from the accompanying drawings and the following description and claims:

Fig. 1 is a side elevation of the machine. Fig. 2 is an enlarged section taken on the line 2—2 of Fig. 1. Fig. 3 is an end elevation taken on the line 3—3 of Fig. 1. Fig. 4 is a section taken on the line 4—4 of Fig. 2. Fig. 5 illustrates a modified form for making V-shaped strips.

In the drawings there is shown a density control and delivery machine mounted upon the supporting standards 10 and 11. Mounted on said standards there are provided pairs of spaced driving sprockets 12 and 13 about which passes the endless conveyor chain belt 14 having a plurality of alternate separated side plates 15 and 16 extending therefrom in such a fashion as to close together when the conveyor is straightened out for forming suitable sides, but permitting the conveyor to freely pass about the sprocket wheels 12.

Mounted on the supporting standard 11 there is a frame 17 extending above the conveyor and adjacent the discharge end thereof. Supported at the side of said frame there is a roll of paraffin paper 18 of suitable width. Mounted on said frame at the bottom thereof and extending between the side plates 15 there is a pressure roller 19 about which the paraffin paper 18 is adapted to pass. The pressure roller 19 is adjustably mounted so that the lowermost portion of the periphery thereof is spaced from the surface of the conveyor to the desired thickness of the ice cream bricks to be formed. Furthermore, said pressure roller is of a width or thickness substantially equal to the desired width of the strip of ice cream to be formed.

Immediately in front of the roller 19 there is an adjustable plate 20 mounted upon the bracket 21 and extending downwardly between the side plates in position to be engaged by the ice cream for maintaining the same to a given level for the purpose hereinafter described.

In operation, the ice cream which is deposited in flake-like or powder formation on the conveyor belt 22, is discharged thru the partition or insulated wall 23 of the hardening room and is discharged upon the density conveyor 14. The ice cream is then carried forward on the conveyor 14 until it contacts with the plate 20 which reduces its level to a predetermined amount, permitting only a certain volume of ice cream to pass. The volume passing the plate determines the density of the ice cream in final form by reason of the relative position of the plate and roll, such as to cause the given volume of flake-like ice cream passing the plate to be reduced to a predetermined thickness by the pressure compacting roll 19. The movement of the conveyor and roll compacting the ice cream forces it forwardly over the supporting shelf 24 or on to a conveyor belt 25 in a ribbon-like form 26 where it may be readily cut by suitable knives to the desired length. The conveyor 25 is driven thru the medium of the driving belt 126 from any suitable source of power thru the pulley 27 which in turn drives the sprocket 13 thru the driving chain 28.

The paraffin paper 18 is deposited on the upper surface of the ribbon 26 by the compacting roll 19, while the bottom and sides of the ribbon 26 of ice cream are covered and protected by the paraffin paper 29 which is carried from the roll 30 and turned up at its sides about the forming block 31, from whence it passes on to conveyor 14.

A thinner, more compact ribbon of ice cream may be obtained by lowering the compacting roll 19; while it may be formed less dense by elevating the same. This would vary the thickness of the ribbon and bricks to be cut therefrom. However, the desired thickness may be obtained together with the desired density by adjusting the plate 20 so as to permit a greater or lesser quantity of ice cream to pass under the compacting roll.

If desired, a suitable fruit or nut hopper 32 may be provided and mounted immediately above the end of the conveyor belt 22, and provided with a dispensing wheel 33 at the bottom which is rotated in timed relation therewith for obtaining proper distribution. For preventing the ice cream to back-flow on the conveyor 14, there is mounted an apron 34 which extends between the belt 29 and the conveyor 14, and between the side plates 15 and 16 thereof. Said apron is provided with suitable sides to guide the falling particles of ice cream between the side plates of the conveyor.

As shown in Figs. 2 and 4, the conveyor 14 is formed of a plurality of links making a chain belt passing about the end sprockets 12 and 13, said links of the conveyor support the side plates 15 and 16 which are rigidly secured thereto, forming, in addition to the side plates of the conveyor, the bottom thereof. Thus when the links of the chain extend in alignment with each other, the bottom portions thereof abut end to end with a smooth surface for supporting the ice cream thereon. The side plates 15 have their edges flaring upwardly and outwardly while a second thickness of the sheet metal used in the construction thereof as indicated at 35 tapers upwardly and inwardly. The side plates 16 are formed to move within the side plates 15 and extend in the same plane as the portions 35 thereof. The plates 16 have their side edges flaring upwardly and outwardly so that when the conveyor is in conveying position the side plates provide an inner smooth surface formed by the plates 16 and the portions 35 of the plates 15.

As illustrated in the modified form shown in Fig. 5, the links of the chain belt 14 are provided with upwardly and diagonally extending side plates 115 and 116 which are V-shaped in cross-section. The pressure roller 119 is provided with a concave surface so that the continuous strip of ice cream delivered by the conveyor will be in such form as to be capable of packing in a cylindrical container. The top surface of the strip will be formed in cross section with an arc having a radius of curvature of the cylindrical container while the side surfaces of the strip 126 will form radial sections of the packed ice cream. Thus the strips 126 may be cut to lengths appropriate to the height of a cylindrical container and packed therein in segments which may be, if desired, of different flavors, each separately wrapped in paraffin paper.

The invention claimed is:

1. A density control and delivering device for ice cream and the like, comprising an endless conveyor upon which the ice cream is discharged, a roller associated therewith in position to engage and compress the ice cream carried by said conveyor to the desired density, an adjustable leveling member mounted in front of said roller for determining the quantity of ice cream to pass thereunder, and means associated with said conveyor and roller for supplying wrapping material to all the surfaces of the compressed ice cream.

2. A density control, forming and delivering device for ice cream and the like, comprising a conveyor for ice cream V-shaped in cross section, means for determining the quantity of ice cream carried thereby, and a roller associated with said conveyor in position to engage and compress the ice cream carried by said conveyor to the desired density, said roller having its engaging periphery concave in cross section whereby the ice cream delivered from said conveyor will have a cross sectional form in the shape of a sector of a circle.

3. A forming and delivering device for ice cream and the like comprising a conveyor having side members forming a V-shaped channelway, means for placing a supply of ice cream thereon, and means for forming the upper surface of said cream in a circular arc whereby the cream is discharged from said conveyor in a cross sectional form of a sector of a circle.

4. A forming and delivering device for ice cream and the like comprising a conveyor having side members forming a V-shaped channelway, means for delivering a supply of ice cream thereon, means for limiting the height of the delivered ice cream, and means for forming the upper surface of said cream in a circular arc whereby the cream is discharged from said conveyor in a cross sectional form of a sector of a circle.

5. A forming and delivering device for ice cream and the like comprising a conveyor having side members forming a V-shaped channelway, means for placing a supply of ice cream thereon, and a roller associated with said conveyor in position to engage said cream and having its periphery concave in form for forming the upper surface of said cream in a circular arc whereby the cream is discharged from said conveyor in a cross sectional form of a sector of a circle.

6. An apparatus for forming a continuous bar of ice cream of predetermined cross-sectional area and predetermined density including an endless conveyor upon which the ice cream is discharged and having side walls, an adjustable plate mounted above said conveyor for reducing the ice cream to a predetermined cross-sectional area without increasing the density and permitting excess ice cream to pile up on the conveyor in advance of said plate and a roller of a length equal to the distance between said side walls and spaced a predetermined distance from the bottom of said conveyor to increase the density of the said ice cream to the predetermined desired limit.

7. An apparatus for forming a continuous bar of ice cream of predetermined cross-sectional area and predetermined density including an endless conveyor having side walls, means for delivering to said conveyor between said side walls, a channel shaped strip of wrapping material, means for delivering the ice cream into said channel shaped strip, an adjustable plate mounted above said conveyor for reducing the ice cream to a predetermined cross-sectional area without increasing the density and permitting excess ice cream to pile up on the conveyor in advance of said plate and a roller of a length equal to the distance between said side walls and spaced a predetermined distance from the bottom of said conveyor to increase the density of the said ice cream to the predetermined desired limit.

8. An apparatus for forming a continuous bar of ice cream of predetermined cross sectional area and predetermined density including an endless conveyor having side walls, means for delivering to said conveyor between said side walls, a channel shaped strip of wrapping material, means for delivering the ice cream into said channel shaped strip, means for reducing the ice cream on said strip to a predetermined cross-sectional area without increasing the density and permitting excess ice cream to pile up in advance of said means and means spaced a predetermined distance from the bottom of said conveyor to increase the density of said ice cream to the predetermined desired limit.

9. A method of forming an aerated frozen material into a continuous bar of a predetermined density including the steps of discharging upon a moving surface the frozen material in a flake-like form with air incorporated therein, retarding the movement of excess material upon said surface to form a layer of uniform cross-section and thereafter compacting said material to a lesser predetermined cross-section while in motion upon said surface to give the desired density.

10. A method of forming a frozen product including the step of supplying a frozen material in a flake-like form, adding a portion of edible solids thereto, thereafter compacting the product into a continuous column of the desired cross section and density, and encasing the product in a flexible wrapper during the compacting thereof.

11. The process of forming a continuous bar of a plastic comestible, including delivering the comestible to a moving wrapper of channel shape, reducing the comestible to predetermined thickness without increasing the density by preventing advancement of excess material with said wrapper, and thereafter compacting the comestible to a lesser predetermined thickness and uniform density.

12. The method of forming a plastic comestible into a continuous bar of a predetermined density and cross-sectional form, including the steps of delivering the comestible to a moving channel to partially fill the same, retarding the movement of excess material in said channel to form a layer of uniform thickness, and thereafter compacting said layer of material in said channel to a lesser uniform thickness than the depth of the channel.

In witness whereof, I have hereunto affixed my signature.

CLARENCE W. VOGT.